United States Patent
Yang

(10) Patent No.: US 10,549,196 B2
(45) Date of Patent: Feb. 4, 2020

(54) METHOD FOR DETERMINING MOVEMENT TRACK, AND USER EQUIPMENT

(71) Applicant: Tencent Technology (Shenzhen) Company Limited, Shenzhen (CN)

(72) Inventor: Fan Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/968,652

(22) Filed: May 1, 2018

(65) Prior Publication Data

US 2018/0243653 A1    Aug. 30, 2018

Related U.S. Application Data

(63) Continuation-in-part of application No. PCT/CN2017/072541, filed on Jan. 25, 2017.

(30) Foreign Application Priority Data

Feb. 1, 2016   (CN) .......................... 2016 1 0071125

(51) Int. Cl.
    *A63F 9/24*         (2006.01)
    *A63F 13/00*        (2014.01)
    (Continued)

(52) U.S. Cl.
    CPC ............ *A63F 13/573* (2014.09); *G01C 21/00* (2013.01); *G01P 13/00* (2013.01)

(58) Field of Classification Search
    USPC .................... 463/1, 20, 22, 25, 30, 31, 39
    See application file for complete search history.

(56) References Cited

U.S. PATENT DOCUMENTS

| 2002/0016194 A1* | 2/2002 | Namba | .................... A63F 13/10 |
| | | | 463/3 |
| 2016/0378204 A1* | 12/2016 | Chen | ........................ G01C 3/08 |
| | | | 345/156 |
| 2018/0075660 A1* | 3/2018 | Jouet | ..................... G06T 19/006 |

FOREIGN PATENT DOCUMENTS

| CN | 1681566 A | 10/2005 |
| CN | 104225917 A | 12/2014 |

(Continued)

OTHER PUBLICATIONS

Tencent Technology, ISRWO, PCT/CN2017/072541, Apr. 27, 2017, 5 pgs.

(Continued)

*Primary Examiner* — Adetokunbo O Torimiro
(74) *Attorney, Agent, or Firm* — Morgan, Lewis & Bockius LLP

(57) ABSTRACT

The present disclosure discloses a method for determining a movement trajectory of a mock object performed at a computing device. The computing device performs the following operations: determining, by the computing device, an action effect of an object instruction of a first mock object acting on a second mock object; obtaining, by the computing device from a preset trajectory template set, a trajectory template corresponding to the action effect; obtaining, by the computing device, information about a staging environment in which the second mock object is located; determining, by the computing device, a movement trajectory of the second mock object according to the information about the staging environment and the trajectory template; and dynamically rendering, by the computing device, the second mock object along the movement trajectory.

17 Claims, 5 Drawing Sheets

(51) Int. Cl.
  *G06F 17/00* (2019.01)
  *G06F 19/00* (2018.01)
  *A63F 13/573* (2014.01)
  *G01C 21/00* (2006.01)
  *G01P 13/00* (2006.01)

(56) References Cited

FOREIGN PATENT DOCUMENTS

| | | |
|---|---|---|
| JP | 2005095387 A | 4/2005 |
| JP | 2007105523 A | 4/2007 |
| JP | 2007222549 A | 9/2007 |
| JP | 2011142997 A | 7/2011 |
| JP | 2018528595 A | 9/2018 |

OTHER PUBLICATIONS

Tencent Technology, IPRP, PCT/CN2017/072541, Aug. 7, 2018, 4 pgs.

\* cited by examiner

Primary curve, Dynamic  Secondary curve,
adjustment segment  Supplemented
performance segment

METHOD FOR DETERMINING MOVEMENT TRACK, AND USER EQUIPMENT

RELATED APPLICATIONS

This application is a continuation-in-part application of PCT/CN2017/072541, entitled "METHOD FOR DETERMINING MOVEMENT TRACK, AND USER EQUIPMENT" filed on Jan. 25, 2017, which claims priority to Chinese Patent Application No. 201610071125.2, filed with the Chinese Patent Office on Feb. 1, 2016 and entitled "METHOD FOR DETERMINING MOVEMENT TRACK, USER EQUIPMENT, AND SYSTEM", both of which are incorporated by reference in their entirety.

FIELD OF THE TECHNOLOGY

The present disclosure relates to the field of computer technologies, and specifically, to a method for determining a movement trajectory, and a computing device.

BACKGROUND OF THE DISCLOSURE

In some current applications, there are usually scenarios in which mock objects send object instructions to each other, and interact with each other. Two mock objects interact with each other or a plurality of mock objects interacts with each other. In the process in which mock objects interact with each other, a particular mock object is usually acted on to move by a long distance or a short distance.

A movement trajectory of the acted-on mock object is usually implemented by means of two solutions: one solution is to prefabricate the movement trajectory of the acted-on mock object by a developer, and the other solution is to simulate the movement trajectory of the acted-on mock object by means of calculation by using a machine engine.

However, there are many cases in which mock objects affect each other. It is impossible for a developer to prefabricate a movement trajectory for each case in which a mock object is acted on. The machine engine calculation manner can be used merely for a case of a moment at which a mock object is acted on. In fact, a mock object may experience many changes in a movement process. Consequently, a movement trajectory calculated by a machine engine usually fails to conform to a current scenario.

SUMMARY

An embodiment of the present disclosure provides a method for determining a movement trajectory, so that the movement trajectory can be determined according to an environment in which an acted-on mock object is currently located. Actual simulation of the movement trajectory of the acted-on mock object can be implemented by using a small calculation amount. An embodiment of the present disclosure further provides a corresponding computing device.

A first aspect of the present disclosure provides a method for determining a movement trajectory performed at a computing device having one or more processors and memory storing instructions to be executed by the one or more processors, including:

determining, by the computing device, an action effect of an object instruction of a first mock object acting on a second mock object;

obtaining, by the computing device from a preset trajectory template set, a trajectory template corresponding to the action effect, and obtaining information about a staging environment in which the second mock object is located;

determining, by the computing device, a movement trajectory of the second mock object according to the information about the staging environment and the trajectory template; and dynamically rendering, by the computing device, the second mock object along the movement trajectory.

A second aspect of the present disclosure provides a computing device having one or more processors, memory coupled to the one or more processors, and a plurality of instructions stored in the memory that, when executed by the one or more processors, cause the computing device to perform the aforementioned method.

A third aspect of the present disclosure provides a non-transitory computer readable storage medium storing instructions for determining a movement trajectory of a mock object in connection with a computing device having one or more processors, the instructions, when executed by the one or more processors, causing the computing device to perform the aforementioned method.

As compared with the existing technology, in which the complexity of manually fabricating a movement trajectory is high, and a movement trajectory that fails to conform to a current scenario is usually obtained by means of machine calculation, according to the method for determining a movement trajectory provided in the embodiments of the present disclosure, a computing device determines an action effect of an object instruction of a first mock object acting on a second mock object; obtains a trajectory template corresponding to the action effect, and obtains information about a staging environment in which the second mock object is located; and determines a movement trajectory of the second mock object according to the information about the staging environment and the trajectory template, so that the movement trajectory can be determined according to an environment in which an acted-on mock object is currently located. Actual simulation of the movement trajectory of the acted-on mock object can be implemented by using a small calculation amount.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

Figure 1:
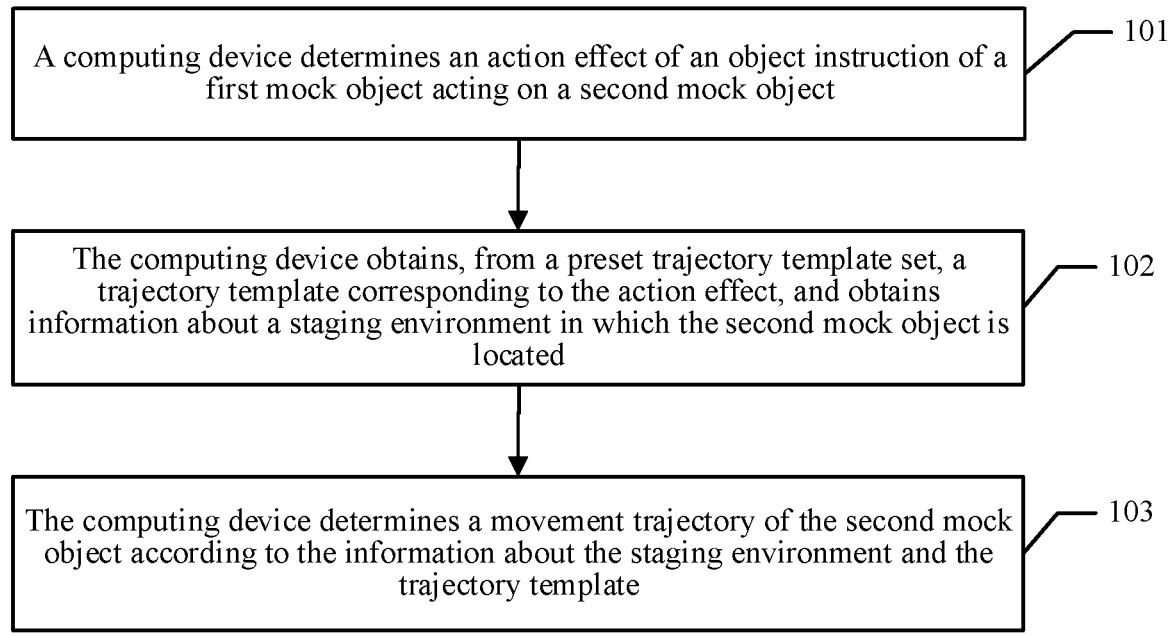
FIG. 1 is a schematic diagram of an embodiment of a method for determining a movement trajectory according to an embodiment of the present disclosure.

An embodiment of the present disclosure provides a method for determining a movement trajectory, so that the movement trajectory can be determined according to an environment in which an acted-on mock object is currently located. Actual simulation of the movement trajectory of the acted-on mock object can be implemented by using a small calculation amount. Embodiments of the present disclosure further provide a corresponding computing device and system. Detailed descriptions are separately provided below.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

With the popularization of the Internet, the game industry has been rapidly developed accordingly. In games, there are a relatively large number of fighting games, including fights between two players, fights between multiple players, stand-alone fights, or online fights. In particular, the current massively multiplayer online (MMO) game is very popular, and the MMO game is the massively multiple-player online role-playing game (MMORPG). There are a large number of fighting scenes in a game of this type. Usually, hundreds of players are involved in fights simultaneously. In the fighting process, characters are usually hit away. Certainly, the MMO game is used merely as an example for description herein, and the case in which characters or monsters are hit away usually exists in many game scenes. Characters and monsters can both be referred to as mock objects. Hitting away may include kicking away by using a foot, punching away by using a fist, knocking away by using a body, beating away by using a weapon, and the like.

In a fight, the performance of simulation in the hit-away flying process and the falling-to-the ground process of a hit-away party plays an important role to a refreshing feeling of the fight. Therefore, a movement trajectory of a hit-away mock object in a hitting-away scene is of great significance. Therefore, in the embodiments of the present disclosure, how to determine the movement trajectory of the hit-away mock object is described next.

In this application, a curve of the movement trajectory of the hit-away mock object may be divided into three parabolas: one primary curve and two segments of secondary curves. The primary curve may be understood as a dynamic adjustment segment, and the two segments of secondary curves are supplemented performance segments. The dynamic adjustment segment has different performance curves based on the topography of an environment in which a mock object is located. When running into a high obstacle, the mock object slides down along the obstacle, takes a leap over a low obstacle, and sinks down and floats up in water after falling into water. In the hitting-away process, corresponding performance items of animations, sounds, and special effects also change accordingly. The auxiliary performance segments are two segments of small parabolas, and can alleviate the rigid performance of landing by means of one segment of curve.

Developers may set several sets of basic templates for the hitting-away solution. For example, five sets of basic templates of a heavy hit-away and five sets of basic templates of a light hit-away may be set, and then when intending to add a template, the developers need to select only one basic template, and configure parameters such as the hitting-away distance, height, floating time, and falling-to-the-ground time on the basic template, so as to obtain a new hitting-away template. In this way, configuration parameters of the new hitting-away template need to include only parameters such as an identifier (ID) of the basic template and the hitting-away distance, height, floating time, and falling-to-the-ground time, thereby greatly reducing the workload of configuring hitting-away templates by the developers.

After the basic templates are configured, in the process of playing the game by players, a computing device may determine the movement trajectory of the hit-away mock object according to the fighting situation of the mock objects in the game.

FIG. 1 is a schematic diagram of an embodiment of a method for determining a movement trajectory according to an embodiment of the present disclosure.

Referring to FIG. 1, an embodiment of the method for determining a movement trajectory according to this embodiment of the present disclosure includes:

101. A computing device determines an action effect of an object instruction of a first mock object acting on a second mock object.

The first mock object and the second mock object may be a character A and a character B, a character A and a monster B, or a monster A and a monster B in the game. The object instruction may be a fighting skill of a mock object in the game, such as a punch or a kick of the mock object. The punch or the kick, for example, may be a heavy punch, a light punch, a heavy kick, or a light kick. The action effect is whether the first mock object hits the second mock object. For example, if the first mock object hits the second mock object by means of a heavy kick, the action effect may be understood as a level-1 heavy hit-away, if the first mock object hits the second mock object by means of a heavy punch, the action effect may be understood as a level-2 heavy hit-away, if the first mock object hits the second mock object by means of a light kick, the action effect may be understood as a level-1 light hit-away, and if the first mock object hits the second mock object by means of a light punch, the action effect may be understood as a level-2 light hit-away. Certainly, several examples are listed herein merely for understanding. In an actual game scene, there are many fighting skills, and action effects may also be divided into many cases.

102. The computing device obtains, from a preset trajectory template set, a trajectory template corresponding to the action effect, and obtains information about a staging environment in which the second mock object is located.

A correspondence between various action effects and trajectory templates may be indicated in a form of a table, or may be expressed in another form. In this application, the correspondence is described, for example, in a form of a table, and the correspondence between the various action effects and the trajectory templates is shown in Table 1.

TABLE 1

| Action effect | ID of a trajectory template |
| --- | --- |
| Level-1 heavy hit-away | Template 1 |
| Level-2 heavy hit-away | Template 2 |
| Level-1 light hit-away | Template 3 |
| Level-2 light hit-away | Template 4 |

Table 1 is merely an example for description. In fact, there may be a plurality of correspondences between the action effects and the trajectory templates.

Figure 2:
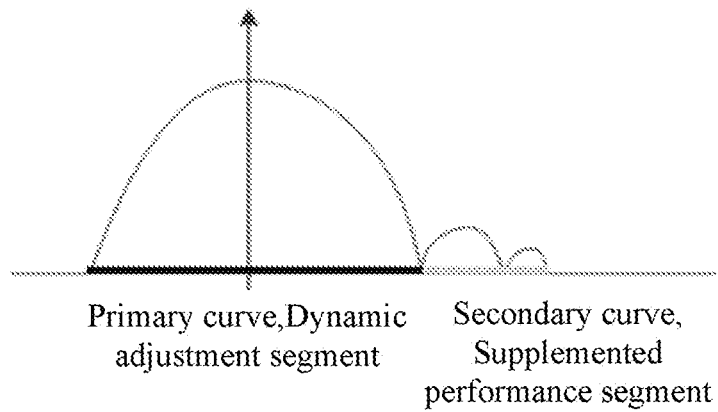
FIG. 2 is an exemplary schematic diagram of a trajectory template according to an embodiment of the present disclosure.

Certainly, an ID of a trajectory template corresponds to the corresponding trajectory template, and reference may be made to FIG. 2 for understanding of the trajectory template. In different trajectory templates, the heights and the widths of parabolas are different for different hitting-away effects.

As shown in FIG. 2, a movement trajectory includes one primary curve segment and two secondary curve segments. The secondary curve segments are used to simulate the feeling of bouncing twice of a hit-away mock object after landing.

For example, the height and the width of a parabola of the level-1 heavy hit-away are greater than those of a parabola of the level-2 heavy hit-away. By such analogy, the height and the width of a parabola of the level-2 light hit-away are smallest in Table 1.

The information about the staging environment in which the second mock object is located is about a topographical environment around the second mock object, for example, whether there is a pool, whether there is an obstacle, or whether a terrain is high or low.

103. The computing device determines a movement trajectory of the second mock object according to the information about the staging environment and the trajectory template. In some embodiments, the computing device then dynamically renders the second mock object along the movement trajectory to visualize the action effect on a display of the computing device.

After the second mock object is hit away, in the flying process, the second mock object may run into an obstacle or fall into water, or may encounter other situations, and may fail to move completely according to the curve shown in the trajectory template. Therefore, a real template is most accurate only when the template is set according to the information about the staging environment.

As compared with the existing technology, in which the complexity of manually fabricating a movement trajectory is high, and a movement trajectory that fails to conform to a current scenario is usually obtained by means of machine calculation, according to the method for determining a movement trajectory provided in the embodiments of the present disclosure, a computing device determines an action effect of an object instruction of a first mock object acting on a second mock object; obtains a trajectory template corresponding to the action effect, and obtains information about a staging environment in which the second mock object is located; and determines a movement trajectory of the second mock object according to the information about the staging environment and the trajectory template, so that the movement trajectory can be determined according to an environment in which an acted-on mock object is currently located. Actual simulation of the movement trajectory of the acted-on mock object can be implemented by using a small calculation amount.

In an embodiment of the present disclosure, a server determines a landing location of the second mock object, generates landing location information of the second mock object, and sends the landing location information to the computing device. The computing device receives the landing location information of the second mock object, and determines, based on the landing location information, the movement trajectory of the second mock object according to the information about the staging environment and the trajectory template.

In an embodiment of the present disclosure, the trajectory template includes a predicted movement trajectory of an object, and the predicted movement trajectory includes a primary movement trajectory, and the determining, by the computing device, a movement trajectory of the second mock object according to the information about the staging environment and the trajectory template includes:

determining, by the computing device, the primary movement trajectory of the predicted movement trajectory according to the information about the staging environment.

In addition, the predicted movement trajectory further includes an auxiliary movement trajectory, and the auxiliary movement trajectory includes at least two segments of curves.

In an embodiment of the present disclosure, before the obtaining, by the computing device, information about a staging environment in which the second mock object is located, the method further includes:

determining, by the computing device, a movement direction of the second mock object according to a direction in which the action instruction acts on the second mock object; and determining, by the computing device, a movement distance of the second mock object according to the action effect; and the obtaining, by the computing device, information about a staging environment in which the second mock object is located includes:

obtaining, by the computing device, the information about the staging environment in the movement direction and within a range of the movement distance.

Specifically, the determined actual trajectory may be understood with reference to the following accompanying drawings.

If the information about the staging environment in which the second mock object is located is about a flat ground on which there is no obstacle, the actual flying is estimated as the curve shown in the trajectory template, as shown in FIG. 2.

Figure 3:
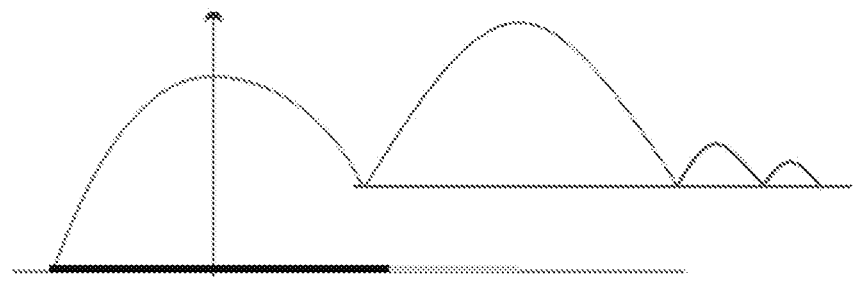
FIG. 3 is an exemplary schematic diagram of a determined movement trajectory according to an embodiment of the present disclosure.

FIG. 3 is a schematic diagram of a movement trajectory of the hit-away mock object that is attacked by another hit-away in a hitting-way process.

In this case, an initially calculated movement trajectory is the trajectory template shown in FIG. 2. However, the hit-away mock object is attacked by another hit-away in the flying process, and then a new movement trajectory is recalculated. That is, when the hit-away mock object is attacked by another hit-away when one segment of hit-away is not completed, a performance item of the current segment is canceled, and a new hitting-away curve is generated by using a current hit-away point as a starting point.

Figure 4:
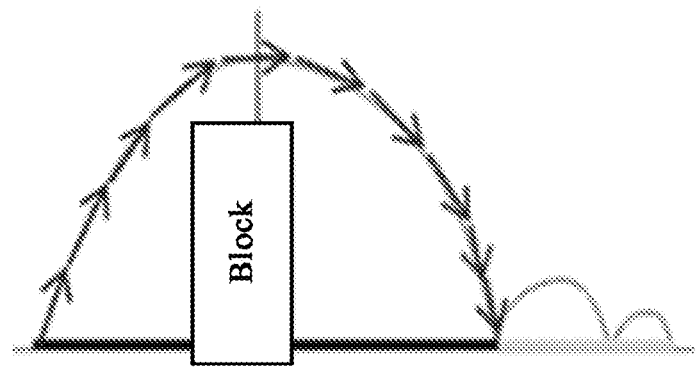
FIG. 4 is another exemplary schematic diagram of a determined movement trajectory according to an embodiment of the present disclosure.

FIG. 4 is a schematic diagram of a movement trajectory of the hit-away mock object that takes a leap over a low obstacle in the hitting-away process.

After the computing device determines the trajectory template, if the computing device determines that an obstacle in the flying process of the second mock object is lower than a flying point, the computing device can determine that the second mock object will take a leap over the obstacle, and keep the original curve shown in the trajectory template to complete the entire hitting-away process.

Figure 5:
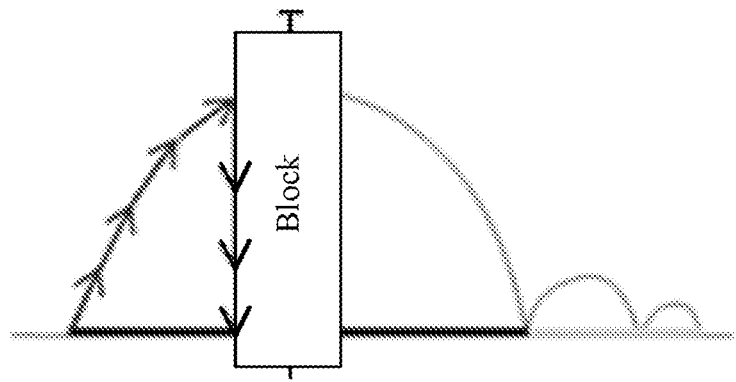
FIG. 5 is still another exemplary schematic diagram of a determined movement trajectory according to an embodiment of the present disclosure.

FIG. 5 is a schematic diagram of a movement trajectory of the hit-away mock object that runs into a high obstacle in the hitting-away process.

After the computing device determines the trajectory template, if the computing device determines that an obstacle in the flying process of the second mock object is higher than the flying point, the computing device can determine that the second mock object cannot take a leap over the obstacle, and will slide down along the obstacle, until a point at which the second mock object can land is calculated. In this way, the actual movement trajectory becomes the movement trajectory that is shown in FIG. 5 and shows that the second mock object does not complete the primary curve segment, and slides down along an obstacle when running into the obstacle until landing.

Figure 6:
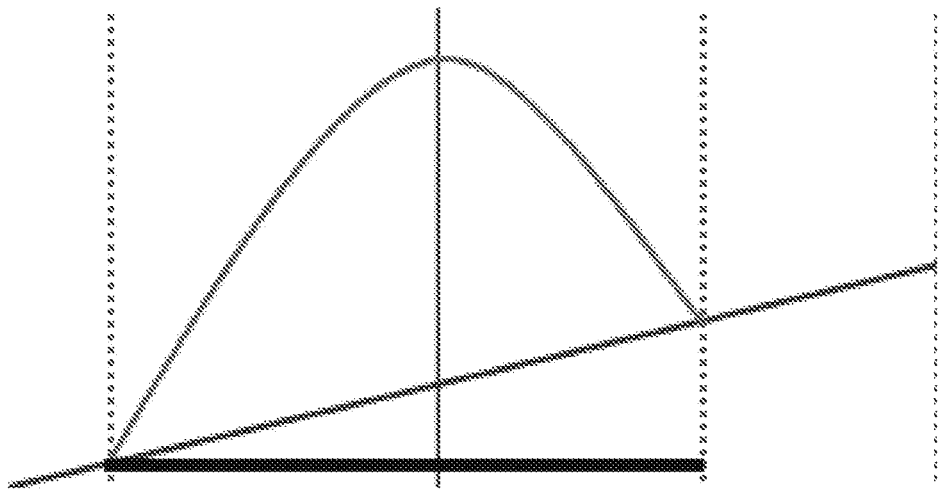
FIG. 6 is still yet another exemplary schematic diagram of a determined movement trajectory according to an embodiment of the present disclosure.

FIG. 6 is a schematic diagram of a movement trajectory showing that a hitting-away path is uphill.

As shown in FIG. 6, if the hitting-away path is uphill, the landing point changes, and the actual movement trajectory becomes the curve shown in FIG. 6.

Figure 7:
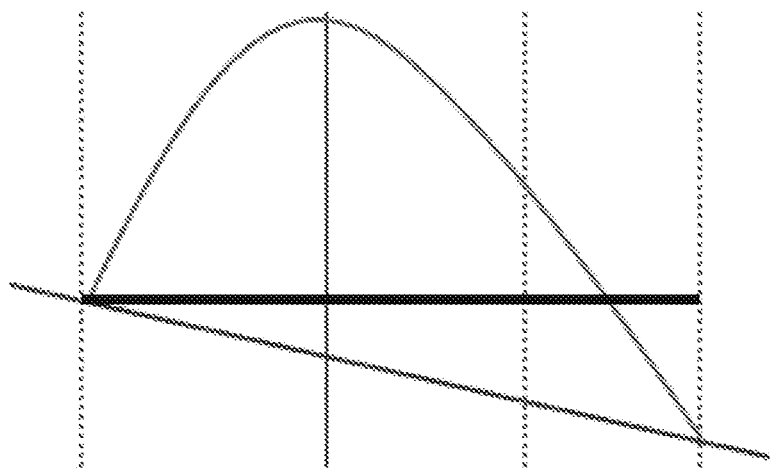
FIG. 7 is a still further exemplary schematic diagram of a determined movement trajectory according to an embodiment of the present disclosure.

FIG. 7 is a schematic diagram of a movement trajectory showing that a hitting-away path is downhill.

As shown in FIG. 7, if the hitting-away path is downhill, the landing point changes, and the actual movement trajectory becomes the curve shown in FIG. 7.

If the second mock object falls into water after being hit away, the second mock object fluctuates in the water. In this case, a landing location calculated by the server is merely a location at which the second mock object falls into the water, and the server generates location information, and sends the location information to the computing device. After receiving the location information, the computing device determines the movement trajectory. In addition, the computing device determines, according to a buoyancy calculation formula, fluctuation of the second mock object in the water. Specifically, downward gravity, upward buoyancy, and upward viscous resistance will act on the second mock object after the second mock object falls into the water. The gravity does not change, and the buoyancy and the viscous resistance both change with the depth of the second mock object in the water. Therefore, the second mock object shows fluctuation in the water.

In addition, in an embodiment of the present disclosure, the trajectory template further includes sound information, and the determining, by the computing device, a movement trajectory of the second mock object according to the information about the staging environment and the trajectory template includes:

determining, by the computing device, the sound information according to the information about the staging environment.

In the foregoing embodiment, description of the movement trajectory is emphasized. In fact, animations, sound effects, special effects, and the like are further configured on trajectory templates.

Figure 8:
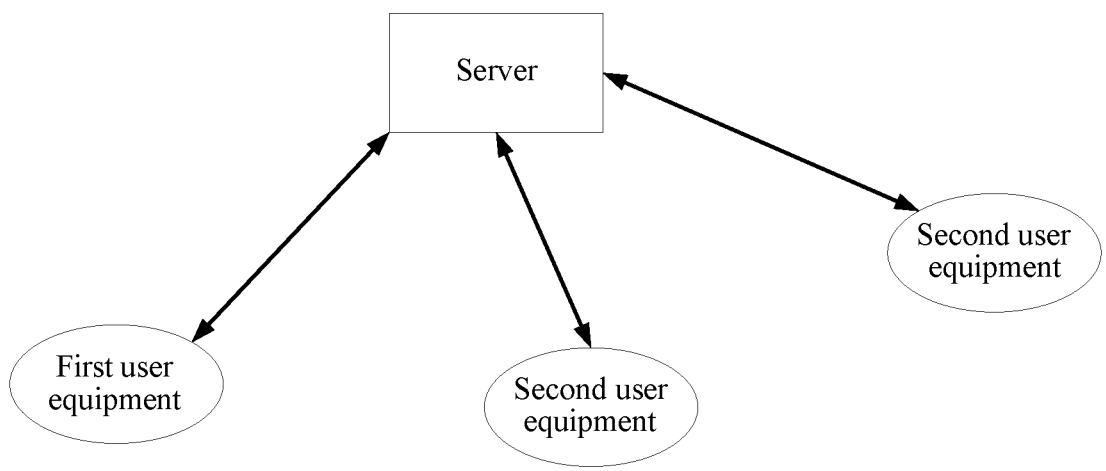
FIG. 8 is a schematic diagram of an embodiment of a system for verifying a movement trajectory according to an embodiment of the present disclosure.

Referring to FIG. 8, an embodiment of a system for verifying a movement trajectory according to an embodiment of the present disclosure includes: a first computing device, a plurality of second computing devices (in the figure, an example in which there are two computing devices is used merely for description, and in fact, only one computing device or many computing devices may be included), and a server.

The first computing device is configured to: determine an action effect of an object instruction of a first mock object acting on a second mock object; obtain, from a preset trajectory template set, a trajectory template corresponding to the action effect, and obtain information about a staging environment in which the second mock object is located; determine a movement trajectory of the second mock object according to the information about the staging environment and the trajectory template; and send the determined movement trajectory of the second mock object to the server.

The server is configured to: verify the movement trajectory;

send a response message to the first computing device when the movement trajectory is appropriate, the response message being used to instruct the first computing device to control the second mock object to move according to the movement trajectory; and generate a new movement trajectory when the movement trajectory is inappropriate, and send the new movement trajectory to the first computing device, so that the first computing device controls the second mock object to move according to the new movement trajectory.

In some embodiments, the server is further configured to:

send the movement trajectory and an identifier of the second mock object to each second computing device when the movement trajectory is appropriate, so that each second computing device controls the second mock object to move according to the movement trajectory; and send the new movement trajectory and the identifier of the second mock object to each second computing device when the movement trajectory is inappropriate, so that each second computing device controls the second mock object to move according to the new movement trajectory.

The system for verifying a movement trajectory according to this embodiment of the present disclosure can ensure that configuration parameters are not maliciously modified, and ensure that movement trajectories are all appropriate. In addition, the server can further control images on the computing devices to be all synchronous.

Figure 9:
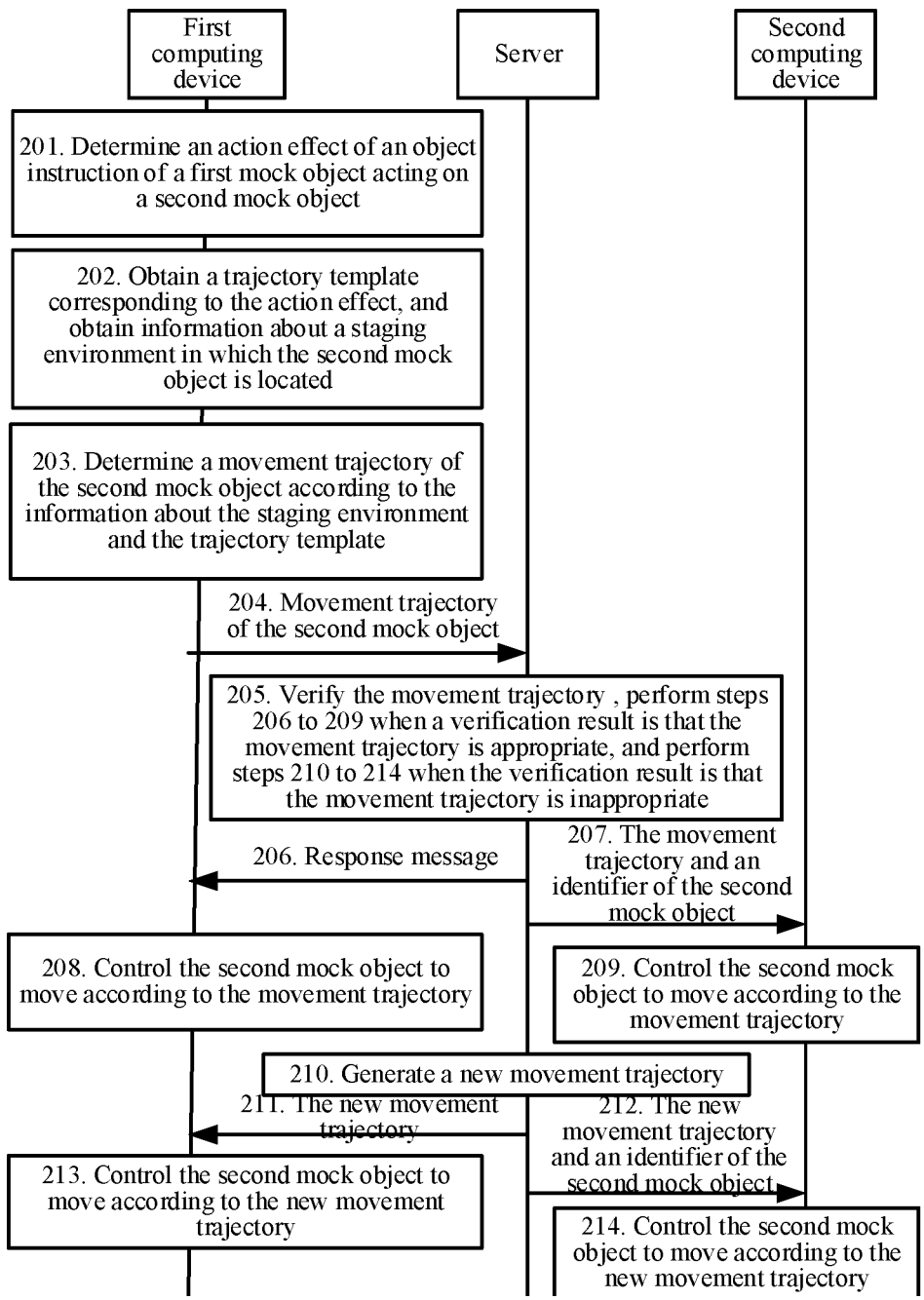
FIG. 9 is a schematic diagram of another embodiment of a system for verifying a movement trajectory according to an embodiment of the present disclosure.

Referring to FIG. 9, another embodiment of a system for verifying a movement trajectory according to an embodiment of the present disclosure includes:

201. A first computing device determines an action effect of an object instruction of a first mock object acting on a second mock object.

202. The first computing device obtains a trajectory template corresponding to the action effect, and obtains information about a staging environment in which the second mock object is located.

203. The first computing device determines a movement trajectory of the second mock object according to the information about the staging environment and the trajectory template.

204. The first computing device sends the determined movement trajectory of the second mock object to a server.

205. The server verifies the movement trajectory of the second mock object, and performs steps 206 to 209 when a verification result is that the movement trajectory is appropriate, and performs steps 210 to 214 when the verification result is that the movement trajectory is inappropriate.

206. The server sends a response message to the first computing device.

207. The server sends the movement trajectory of the second mock object and an identifier of the second mock object to a second computing device.

208. The first computing device controls, according to the response message, the second mock object to move according to the movement trajectory.

209. The second computing device controls the second mock object to move according to the movement trajectory.

There may be a plurality of second computing devices, and only one second computing device is drawn in FIG. 9 for exemplary description.

210. When the verification result is that the movement trajectory is inappropriate, the server generates a new movement trajectory.

211. The server sends the new movement trajectory to the first computing device.

212. The server sends the new movement trajectory and an identifier of the second mock object to the first computing device.

213. The first computing device controls the second mock object to move according to the new movement trajectory.

214. The second computing device controls the second mock object to move according to the new movement trajectory.

The system for verifying a movement trajectory according to this embodiment of the present disclosure can ensure that configuration parameters are not maliciously modified, and ensure that movement trajectories are all appropriate. In addition, the server can further control images on the computing devices to be all synchronous.

Figure 10:
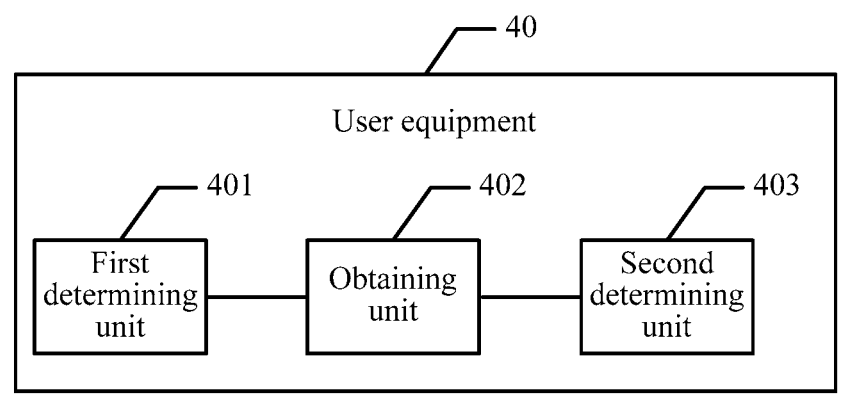
FIG. 10 is a schematic diagram of an embodiment of a computing device according to an embodiment of the present disclosure.

Referring to FIG. 10, an embodiment of a computing device according to an embodiment of the present disclosure includes:

a first determining unit 301, configured to determine an action effect of an object instruction of a first mock object acting on a second mock object;

an obtaining unit 302, configured to: obtain, from a preset trajectory template set, a trajectory template corresponding to the action effect determined by the first determining unit 301, and obtain information about a staging environment in which the second mock object is located; and a second determining unit 303, configured to determine a movement trajectory of the second mock object according to the information about the staging environment and the trajectory template that are obtained by the obtaining unit 302.

The computing device according to this embodiment of the present disclosure can determine a movement trajectory according to an environment in which an acted-on mock object is currently located. Actual simulation of the movement trajectory of the acted-on mock object can be implemented by using a small calculation amount.

In some embodiments, based on the foregoing embodiment corresponding to FIG. 10, in an optional embodiment of the computing device according to this embodiment of the present disclosure, the first determining unit 301 is configured to: determine a distance between the first mock object and the second mock object, and determine, according to the distance, the action effect of the object instruction acting on the second mock object.

In this embodiment of the present disclosure, the action effect of the object instruction is determined by using the distance between the two mock objects, so that the efficiency of determining the action effect can be improved.

In some embodiments, based on the foregoing embodiment corresponding to FIG. 10, in another embodiment of the present disclosure, the computing device further includes: a receiving unit, configured to receive landing location information, sent by a server, of the second mock object. The landing location information is used to indicate a landing location of the second mock object.

In an embodiment of the present disclosure, the second determining unit is further configured to determine, based on the received landing location information, the movement trajectory of the second mock object according to the information about the staging environment and the trajectory template.

In an embodiment of the present disclosure, the trajectory template includes a predicted movement trajectory of an object, and the predicted movement trajectory includes a primary movement trajectory, and the second determining unit is further configured to determine the primary movement trajectory of the predicted movement trajectory according to the information about the staging environment.

In an embodiment of the present disclosure, the trajectory template includes sound information, and the second determining unit is further configured to determine the sound information according to the information about the staging environment.

In an embodiment of the present disclosure, the predicted movement trajectory further includes an auxiliary movement trajectory, and the auxiliary movement trajectory includes at least two segments of curves.

In an embodiment of the present disclosure, the obtaining unit 302 is configured to determine, according to a preconfigured correspondence between various action effects and trajectory templates, the trajectory template corresponding to the action effect.

In some embodiments, in the computing device according to this embodiment of the present disclosure, the first determining unit 301 is further configured to: determine a movement direction of the second mock object according to a direction in which the action instruction acts on the second mock object, and determine a movement distance of the second mock object according to the action effect.

The obtaining unit 302 is configured to obtain the information about the staging environment in the movement direction and within a range of the movement distance, the movement direction and the movement distance being determined by the first determining unit 301.

In this embodiment of the present disclosure, the range in which the information about the staging environment is obtained is narrowed by determining the action direction and the movement distance, so that the obtaining efficiency is improved.

In some embodiments, based on the foregoing optional embodiment of the computing device, in the computing device according to this embodiment of the present disclosure, the second determining unit 303 is configured to: adjust the trajectory template according to the information about the staging environment in the movement direction and within the range of the movement distance, the information being obtained by the obtaining unit 302, and determine the movement trajectory of the second mock object.

According to this embodiment of the present disclosure, the trajectory template is adjusted according to the information about the staging environment in the movement direction and within the range of the movement distance, so that the obtained movement trajectory can be ensured to be more accurate.

Figure 11:
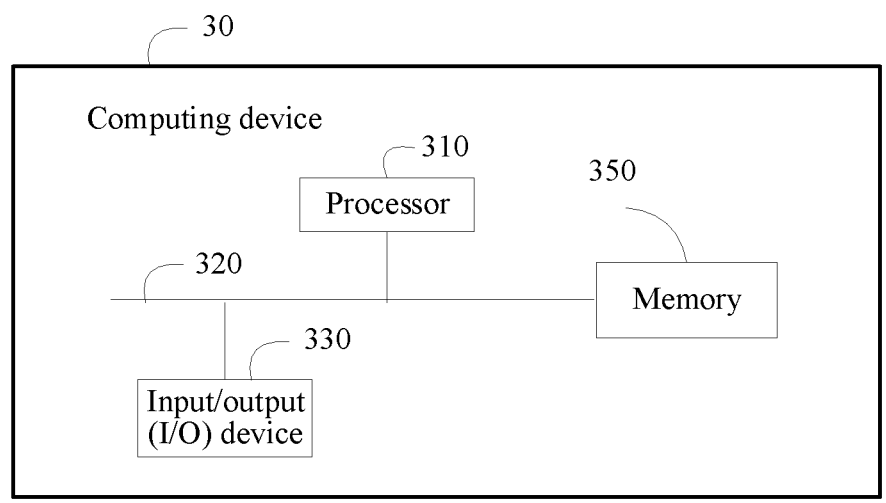
FIG. 11 is a schematic diagram of another embodiment of a computing device according to an embodiment of the present disclosure.

FIG. 11 is a schematic structural diagram of a computing device 30 according to an embodiment of the present disclosure. The computing device 30 is applied to a system for verifying a movement trajectory. The system for verifying a movement trajectory includes a computing device and a server. The computing device 30 includes a processor 310, a memory 350, and an input/output (I/O) device 330. The memory 350 may include a read-only memory (ROM) and a random access memory (RAM), and provides operating instructions and data to the processor 310. A part of the memory 350 may further include a nonvolatile random access memory (NVRAM).

In some implementations, the memory 350 stores the following elements, executable modules, or data structures, or subsets thereof, or extended sets thereof:

in an embodiment of the present disclosure, by calling the operating instructions stored in the memory 350 (the operating instructions may be stored in an operating system), an action effect of an object instruction of a first mock object acting on a second mock object is determined, a trajectory template corresponding to the action effect is obtained from a preset trajectory template set, and information about a staging environment in which the second mock object is located is obtained, and a movement trajectory of the second mock object is determined according to the information about the staging environment and the trajectory template.

As compared with the existing technology, in which the complexity of manually fabricating a movement trajectory is high, and a movement trajectory that fails to conform to a current scenario is usually obtained by means of machine calculation, the computing device according to this embodiment of the present disclosure can determine a movement trajectory according to an environment in which an acted-on mock object is currently located. Actual simulation of the movement trajectory of the acted-on mock object can be implemented by using a small calculation amount.

The processor 310 controls operation of the computing device 30. The processor 310 may also be referred to as a central processing unit (CPU). The memory 350 may include a ROM and a RAM, and provides instructions and data to the processor 310. A part of the memory 350 may further include an NVRAM. In specific application, components in the computing device 30 are coupled together by using a bus system 320. The bus system 320 may also include a power supply bus, a control bus, a status signal bus, and the like in addition to a data bus. However, to clarify the description, the buses are all marked as the bus system 320 in the figure.

The foregoing method disclosed in the embodiments of the present disclosure may be applied to the processor 310, or implemented by the processor 310. The processor 310 may be an integrated circuit chip, and has a signal processing capability. In an implementation process, steps of the foregoing method may be completed by using an integrated logic circuit of hardware in the processor 310 or an instruction in a software form. The foregoing processor 310 may be a general purpose processor, a digital signal processor (DSP), an application-specific integrated circuit (ASIC), a field programmable gate array (FPGA) or another programmable logic device, a discrete gate, a transistor logic device, or a discrete hardware component. The processor 310 can implement or perform the methods, steps, and logic block diagrams disclosed in the embodiments of the present disclosure. The general purpose processor may be a microprocessor, any conventional processor, or the like. Steps of the method disclosed with reference to the embodiments of the present disclosure may be directly reflected as being performed and completed by a hardware decoding processor, or by a combination of hardware and software modules in the decoding processor. The software module may be located in a non-transitory computer readable storage medium in the art such as a RAM, a flash memory, a ROM, a programmable ROM, an electrically erasable programmable memory, or a register. The storage medium is located in the memory 350. The processor 310 reads information in the memory 350. Steps of the foregoing method are completed in combination with hardware thereof.

In some embodiments, the processor 310 is configured to: determine a distance between the first mock object and the second mock object, and determine, according to the distance, the action effect of the object instruction acting on the second mock object.

In some embodiments, the processor 310 is configured to: determine, according to a preconfigured correspondence between various action effects and trajectory templates, the trajectory template corresponding to the action effect.

In some embodiments, the processor 310 is configured to: determine a movement direction of the second mock object according to a direction in which the action instruction acts on the second mock object, determine a movement distance of the second mock object according to the action effect, and obtain information about the staging environment in the movement direction and within a range of the movement distance.

In some embodiments, the processor 310 is configured to: adjust the trajectory template according to the information about the staging environment in the movement direction and within the range of the movement distance, and determine the movement trajectory of the second mock object.

In some embodiments, the I/O device 330 is configured to send the determined movement trajectory of the second mock object to the server, so that the server verifies the movement trajectory.

Reference may be made to some of the descriptions of FIG. 1 to FIG. 10 for understanding of the foregoing computing device 30. Details are not described herein again.

A person of ordinary skill in the art may understand that all or some of the steps of the methods in the foregoing embodiments may be completed by a program instructing relevant hardware. The program may be stored in a non-transitory computer readable storage medium. The storage medium may include: a ROM, a RAM, a magnetic disk, an optical disc, or the like.

The method for determining a movement trajectory, the computing device, and the system according to the embodiments of the present disclosure are described above in detail. Although the principles and implementations of the present disclosure are described by using specific examples in this specification, the descriptions of the foregoing embodiments are merely intended to help understand the method and the core idea thereof of the present disclosure. Meanwhile, a person of ordinary skill in the art may make modifications to both the specific implementations and the application range according to the idea of the present disclosure. In conclusion, the content of this specification should not be construed as a limitation to the present disclosure.

What is claimed is:

1. A method for determining a movement trajectory performed at a computing device having one or more processors and memory storing instructions to be executed by the one or more processors, the method comprising:
   determining, by the computing device, an action effect of an object instruction of a first mock object acting on a second mock object;
   obtaining, by the computing device, information about a staging environment in which the second mock object is located;
   obtaining, by the computing device from a preset trajectory template set, a trajectory template corresponding to the action effect, wherein the trajectory template comprises a predicted movement trajectory curve that comprises (1) a dynamic adjustment segment including multiple performance curves based on a topography of the staging environment and (2) one or more auxiliary performance segments that supplement the dynamic adjustment segment;
   determining, by the computing device, a movement trajectory of the second mock object according to the information about the staging environment, wherein the movement trajectory includes a primary movement trajectory according to a first performance curve and includes an auxiliary movement trajectory of the one or more auxiliary performance segments from the trajectory template; and
   dynamically rendering, by the computing device, the second mock object along the movement trajectory.

2. The method according to claim 1, wherein the determining, by the computing device, an action effect of an object instruction of a first mock object acting on a second mock object comprises:
   determining, by the computing device, a distance between the first mock object and the second mock object; and
   determining, by the computing device according to the distance, the action effect of the object instruction acting on the second mock object.

3. The method according to claim 1, further comprising:
   receiving, by the computing device, landing location information, sent by a server, of the second mock object, the landing location information being used to indicate a landing location of the second mock object; and
   determining, by the computing device based on the received landing location information, the movement trajectory of the second mock object according to the information about the staging environment and the trajectory template.

4. The method according to claim 1, wherein the auxiliary movement trajectory comprises at least two segments of curves.

5. The method according to claim 1, wherein the obtaining, by the computing device, a trajectory template corresponding to the action effect comprises:
   determining, by the computing device according to a preconfigured correspondence between various action effects and trajectory templates, the trajectory template corresponding to the action effect.

6. The method according to claim 1, wherein before the obtaining, by the computing device, information about a staging environment in which the second mock object is located, the method further comprises:
   determining, by the computing device, a movement direction of the second mock object according to a direction in which the action instruction acts on the second mock object; and
   determining, by the computing device, a movement distance of the second mock object according to the action effect; and
   the obtaining, by the computing device, information about a staging environment in which the second mock object is located comprises:
   obtaining, by the computing device, the information about the staging environment in the movement direction and within a range of the movement distance.

7. The method according to claim 6, wherein the determining, by the computing device according to the distance, the action effect of the object instruction acting on the second mock object comprises:
   adjusting the trajectory template according to the obtained information about the staging environment in the movement direction and within the range of the movement distance, and determining the movement trajectory of the second mock object.

8. A computing device, comprising:
   one or more processors;
   memory coupled to the one or more processors; and
   a plurality of instructions stored in the memory that, when executed by the one or more processors, cause the computing device to perform the following operations:
      determining, by the computing device, an action effect of an object instruction of a first mock object acting on a second mock object;
      obtaining, by the computing device, information about a staging environment in which the second mock object is located;
      obtaining, by the computing device from a preset trajectory template set, a trajectory template corresponding to the action effect, wherein the trajectory template comprises a predicted movement trajectory curve that comprises (1) a dynamic adjustment segment including multiple performance curves based on a topography of the staging environment and (2) one or more auxiliary performance segments that supplement the dynamic adjustment segment;
      determining, by the computing device, a movement trajectory of the second mock object according to the information about the staging environment, wherein the movement trajectory includes a primary movement trajectory according to a first performance curve and includes an auxiliary movement trajectory of the one or more auxiliary performance segments from the trajectory template; and
      dynamically rendering, by the computing device, the second mock object along the movement trajectory.

9. The computing device according to claim 8, wherein the determining, by the computing device, an action effect of an object instruction of a first mock object acting on a second mock object comprises:
   determining, by the computing device, a distance between the first mock object and the second mock object; and
   determining, by the computing device according to the distance, the action effect of the object instruction acting on the second mock object.

10. The computing device according to claim 8, wherein the operations further comprise:
    receiving, by the computing device, landing location information, sent by a server, of the second mock object, the landing location information being used to indicate a landing location of the second mock object; and determining, by the computing device based on the received landing location information, the movement trajectory of the second mock object according to the information about the staging environment and the trajectory template.

11. The computing device according to claim 8, wherein the obtaining, by the computing device, a trajectory template corresponding to the action effect comprises:

determining, by the computing device according to a preconfigured correspondence between various action effects and trajectory templates, the trajectory template corresponding to the action effect.

12. The computing device according to claim 8, wherein before the obtaining, by the computing device, information about a staging environment in which the second mock object is located, the operations further comprise:

determining, by the computing device, a movement direction of the second mock object according to a direction in which the action instruction acts on the second mock object; and determining, by the computing device, a movement distance of the second mock object according to the action effect; and the obtaining, by the computing device, information about a staging environment in which the second mock object is located comprises:

obtaining, by the computing device, the information about the staging environment in the movement direction and within a range of the movement distance.

13. A non-transitory computer readable storage medium storing instructions for determining a movement trajectory of a mock object in connection with a computing device having one or more processors, wherein the instructions, when executed by the one or more processors, cause the computing device to perform the following operations:

determining, by the computing device, an action effect of an object instruction of a first mock object acting on a second mock object;

obtaining, by the computing device, information about a staging environment in which the second mock object is located;

obtaining, by the computing device from a preset trajectory template set, a trajectory template corresponding to the action effect, wherein the trajectory template comprises a predicted movement trajectory curve that comprises (1) a dynamic adjustment segment including multiple performance curves based on a topography of the staging environment and (2) one or more auxiliary performance segments that supplement the dynamic adjustment segment;

determining, by the computing device, a movement trajectory of the second mock object according to the information about the staging environment, wherein the movement trajectory includes a primary movement trajectory according to a first performance curve and includes an auxiliary movement trajectory of the one or more auxiliary performance segments from the trajectory template; and dynamically rendering, by the computing device, the second mock object along the movement trajectory.

14. The non-transitory computer readable storage medium according to claim 13, wherein the determining, by the computing device, an action effect of an object instruction of a first mock object acting on a second mock object comprises:

determining, by the computing device, a distance between the first mock object and the second mock object; and determining, by the computing device according to the distance, the action effect of the object instruction acting on the second mock object.

15. The non-transitory computer readable storage medium according to claim 13, wherein the operations further comprise:

receiving, by the computing device, landing location information, sent by a server, of the second mock object, the landing location information being used to indicate a landing location of the second mock object; and determining, by the computing device based on the received landing location information, the movement trajectory of the second mock object according to the information about the staging environment and the trajectory template.

16. The non-transitory computer readable storage medium according to claim 13, wherein the obtaining, by the computing device, a trajectory template corresponding to the action effect comprises:

determining, by the computing device according to a preconfigured correspondence between various action effects and trajectory templates, the trajectory template corresponding to the action effect.

17. The non-transitory computer readable storage medium according to claim 13, wherein before the obtaining, by the computing device, information about a staging environment in which the second mock object is located, the operations further comprise:

determining, by the computing device, a movement direction of the second mock object according to a direction in which the action instruction acts on the second mock object; and determining, by the computing device, a movement distance of the second mock object according to the action effect; and the obtaining, by the computing device, information about a staging environment in which the second mock object is located comprises:

obtaining, by the computing device, the information about the staging environment in the movement direction and within a range of the movement distance.

* * * * *